United States Patent
Hong

(10) Patent No.: US 12,005,406 B2
(45) Date of Patent: Jun. 11, 2024

(54) VENTURI NOZZLE APPARATUS

(71) Applicant: PURITECH Co., Ltd., Asan-si (KR)

(72) Inventor: Sung Hun Hong, Asan-si (KR)

(73) Assignee: PURITECH Co., Ltd., Asan-si (KR)

( * ) Notice: Subject to any disclaimer, the term of this patent is extended or adjusted under 35 U.S.C. 154(b) by 100 days.

(21) Appl. No.: 17/505,609

(22) Filed: Oct. 19, 2021

(65) Prior Publication Data
US 2022/0370962 A1     Nov. 24, 2022

(30) Foreign Application Priority Data

May 20, 2021    (KR) ........................ 10-2021-0064573

(51) Int. Cl.
    *B01F 25/312*       (2022.01)
    *B01F 23/232*       (2022.01)
    *B01F 101/00*      (2022.01)

(52) U.S. Cl.
    CPC ...... *B01F 25/31242* (2022.01); *B01F 23/232* (2022.01); *B01F 25/312512* (2022.01); *B01F 25/31252* (2022.01); *B01F 2101/305* (2022.01)

(58) Field of Classification Search
    CPC .............. B01F 23/232; B01F 25/31242; B01F 25/31252; B01F 25/312512; B01F 2101/305
    USPC ...................................................... 261/38, 76
    See application file for complete search history.

(56) References Cited

U.S. PATENT DOCUMENTS

| | | | | |
|---|---|---|---|---|
| 2,953,160 | A | * | 9/1960 | Brazier ............. B01F 25/31243 137/895 |
| 4,123,800 | A | | 10/1978 | Mazzei |
| 4,344,752 | A | | 8/1982 | Gallagher, Jr. |
| 4,664,147 | A | * | 5/1987 | Maddock ............ B01F 35/2211 137/892 |
| 9,931,601 | B2 | * | 4/2018 | Engelhard ........... B01F 23/2323 |
| 2007/0152355 | A1 | | 7/2007 | Hartley |
| 2017/0020062 | A1 | | 1/2017 | Lovato |

FOREIGN PATENT DOCUMENTS

| | | |
|---|---|---|
| CN | 105682781 A | 6/2016 |
| CN | 108373256 A | 8/2018 |
| CN | 109433035 A | 3/2019 |

(Continued)

*Primary Examiner* — Charles S Bushey
(74) *Attorney, Agent, or Firm* — Park, Kim & Suh, LLC

(57) ABSTRACT

The present inventive concept relates to a venturi nozzle apparatus. Specifically, an embodiment of the present inventive concept provides a venturi nozzle apparatus which mixes water and a gas to dissolve the gas in the water, the venturi nozzle apparatus including a housing in which a flow pipe through which at least one of the water and the water in which the gas is dissolved selectively flows and a bypass pipe which communicates with the flow pipe to selectively bypass at least one of the water and the water in which the gas is dissolved flowing through the flow pipe are disposed, an injector unit which is detachably inserted into the flow pipe of the housing and configured to selectively receive the gas and the water to dissolve the gas in the water, and a valve member which is inserted into the bypass pipe of the housing and configured to cause at least one of the water and the water in which the gas is dissolved to flow to at least one of the flow pipe of the housing and the bypass pipe of the housing.

9 Claims, 7 Drawing Sheets

(56) References Cited

FOREIGN PATENT DOCUMENTS

| | | | | |
|---|---|---|---|---|
| CN | 210566348 | U | * | 5/2020 |
| CN | 111617654 | A | | 9/2020 |
| EP | 2277617 | A1 | | 1/2011 |
| JP | H08-155430 | A | | 6/1996 |
| JP | 2017-104841 | A | | 6/2017 |

* cited by examiner (C–C)

VENTURI NOZZLE APPARATUS

CROSS-REFERENCE TO RELATED APPLICATION

This application claims priority to Korean Patent Application No. 2021-0064573 filed on May 20, 2021, in the Korean Intellectual Property Office (KIPO), the entire contents of which are hereby incorporated by reference.

BACKGROUND

1. Technical Field

Example embodiments of the present disclosure relate to a venturi nozzle apparatus.

2. Related Art

In general, a venturi nozzle apparatus provided in a microbubble generation system that generates microbubbles refers to an apparatus that uses the venturi effect to mix water and gas and, in the mixing process, dissolves the gas in the water.

The venturi nozzle apparatus includes an injector unit configured to receive water and gas from the outside and dissolve the gas in the water and a bypass pipe connected to the injector unit.

In this case, when at least a portion of the water provided to the injector unit from the outside is bypassed through the bypass pipe, and the water is bypassed to the bypass pipe, pressure of the water introduced into the injector unit is changed and thus the amount of gas supplied to the injector unit is controlled. Accordingly, solubility of the gas in the water may be controlled in the injector unit.

However, in this case, since the bypass pipe should be provided separately, there are problems in that a manufacturing process for manufacturing the venturi nozzle apparatus becomes complex and the manufacturing costs increase.

Also, there is a risk that at least one of the water, gas, and water in which the gas is dissolved may leak through a portion where the injector unit and the bypass pipe are connected.

Furthermore, since the injector unit is designed to correspond only to a preset amount of flow, there is a problem in that it is not possible to correspond to a change in the amount of flow.

SUMMARY

Accordingly, example embodiments of the present inventive concept are provided to substantially obviate one or more problems due to limitations and disadvantages of the related art.

Example embodiments of the present inventive concept provide a venturi nozzle apparatus capable of simplifying a manufacturing process, reducing manufacturing costs, and corresponding to a change in the amount of flow.

In some example embodiments, a venturi nozzle apparatus which mixes water and a gas to dissolve the gas in the water includes a housing in which a flow pipe, through which at least one of the water and the water in which the gas is dissolved selectively flows, and a bypass pipe, which communicates with the flow pipe to selectively bypass at least one of the water and the water in which the gas is dissolved flowing through the flow pipe, are disposed, an injector unit which is detachably inserted into the flow pipe of the housing and configured to selectively receive the gas and the water to dissolve the gas in the water, and a valve member which is inserted into the bypass pipe of the housing and configured to cause at least one of the water and the water in which the gas is dissolved to flow to at least one of the flow pipe of the housing and the bypass pipe of the housing.

Also, the flow pipe may include a supply end portion which is open to allow the water to be selectively supplied, a discharge end portion which is disposed at a position opposite to the supply end portion and which is open to allow the water in which the gas is dissolved to be discharged, and a flow pipe side flow path portion which is provided between the supply end portion and the discharge end portion and through which at least one of the water and the water in which the gas is dissolved selectively flows.

Also, the flow pipe side flow path portion may include a step which is formed due to at least a portion of an inner side surface protruding, and as the injector unit inserted through the supply end portion of the flow pipe is caught at the step, the injector unit may be prevented from being detached through the discharge end portion of the flow pipe.

Also, the bypass pipe may include an insertion end portion which is open to allow the valve member to be inserted, a closed end portion which is disposed at a position opposite to the insertion end portion and closed, and a bypass pipe side flow path portion which is provided between the insertion end portion and the closed end portion and through which at least one of the water and the water in which the gas is dissolved selectively flows.

Also, according to a degree to which the valve member is inserted into the bypass pipe of the housing, at least one of the water and the water in which the gas is dissolved flowing through the flow pipe of the housing may be bypassed to the bypass pipe of the housing, and thus an amount of the gas being supplied to the injector unit may be controlled.

Also, the venturi nozzle apparatus may further include a stopper member which is selectively inserted into the housing to prevent the injector unit inserted through the supply end portion of the flow pipe from being detached through the supply end portion of the flow pipe.

Also, the injector unit may include a main body which forms an exterior and is replaceably inserted into the flow pipe, a venturi member which is disposed inside the main body and has a venturi flow path through which the gas and the water are able to be mixed and flow, and a plurality of injection members which have one end portion connected to the main body and the other end portion connected to the venturi member and which are disposed to be spaced apart in a circumferential direction of the venturi member.

Also, the main body may include a protruding portion which has at least a portion of an outer side surface protruding radially inward from the main body and an inner side surface to which the other end portion of the injection member is connected to communicate, and the protruding portion may extend in a circumferential direction of the main body.

Also, the venturi nozzle apparatus may further include a gas supply member which is provided to be connectable to the housing and connected to communicate with the injection member of the injector unit to selectively supply the gas from the outside to the injector unit.

Also, the gas provided from the outside through the gas supply member may flow in a space which is formed due to the inner side surface of the flow pipe side flow path portion and the outer side surface of the protruding portion being spaced apart from each other, and the gas flowing in the space may be supplied to the plurality of injection members.

Also, a gas supply member insertion hole into which the gas supply member is selectively inserted may be formed in the housing.

Also, a stopper member insertion hole into which the stopper member is selectively inserted may be formed in the housing.

BRIEF DESCRIPTION OF DRAWINGS

Example embodiments of the present inventive concept will become more apparent by describing example embodiments of the present inventive concept in detail with reference to the accompanying drawings, in which.

DESCRIPTION OF EXAMPLE EMBODIMENTS

Figure 1:
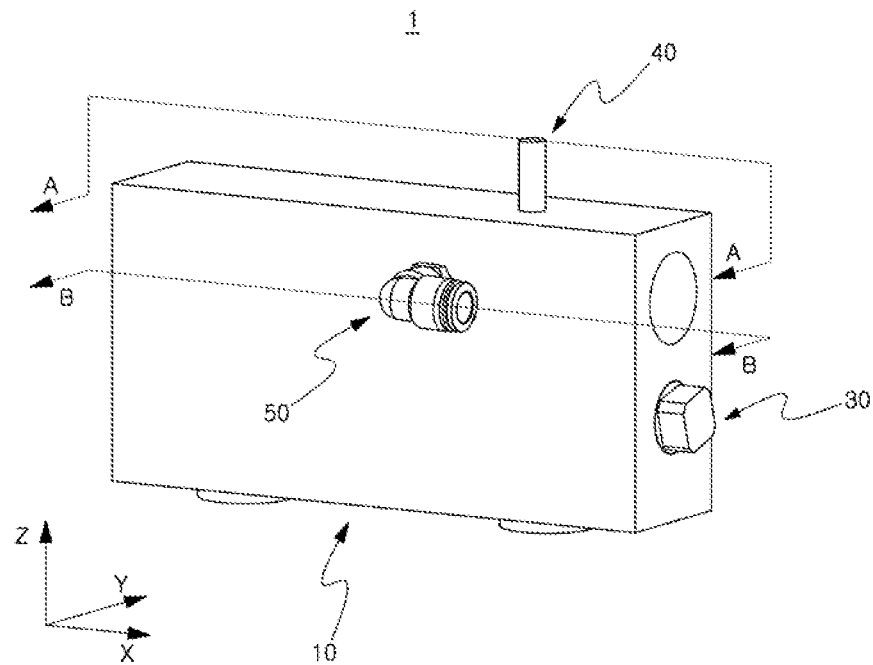
FIG. 1 is a perspective view illustrating a venturi nozzle apparatus according to an embodiment of the present inventive concept.
Figure 2:
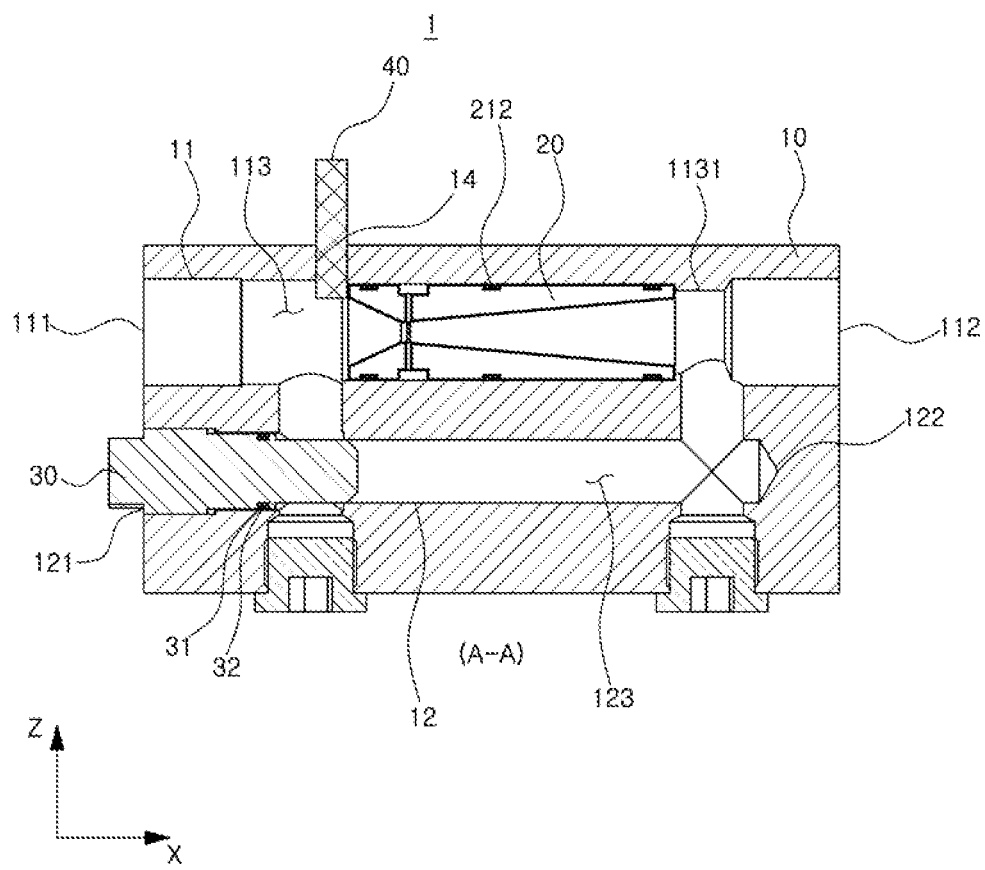
FIG. 2 is a cross-sectional view taken along line A-A of FIG. 1.
Figure 3:
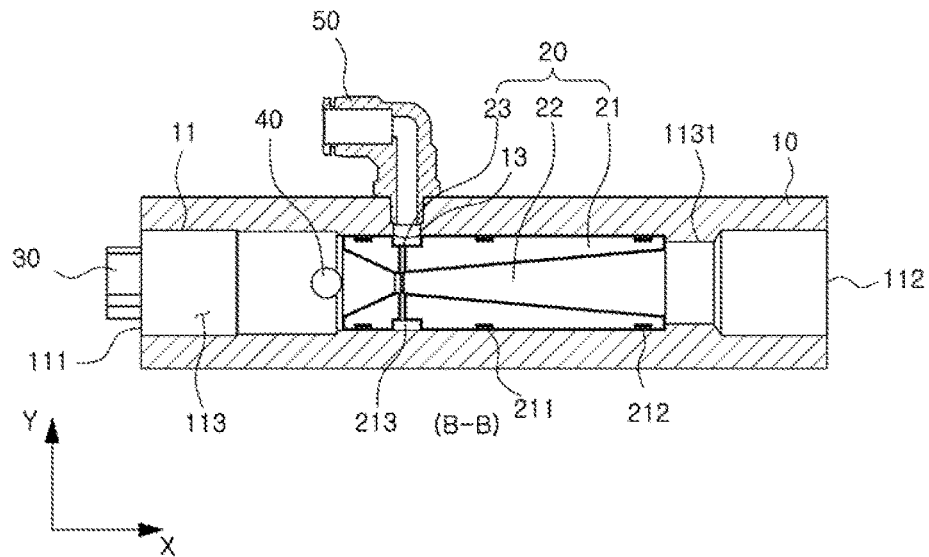
FIG. 3 is a cross-sectional view taken along line B-B of FIG. 1.
Figure 4:
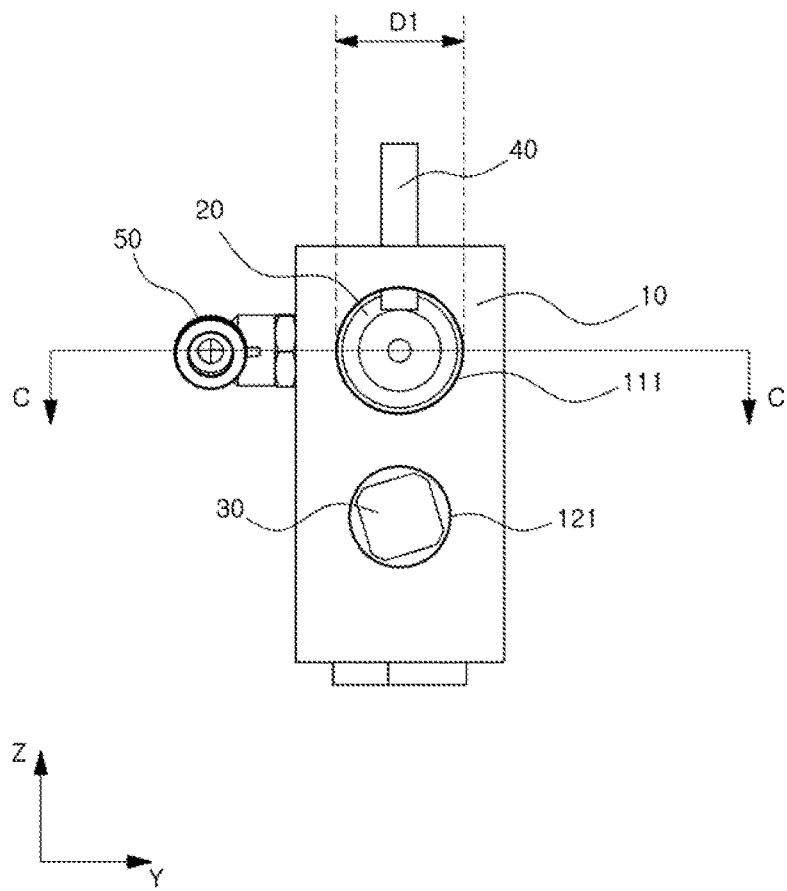
FIG. 4 is a right-side view of the venturi nozzle apparatus of FIG. 1.
Figure 5:
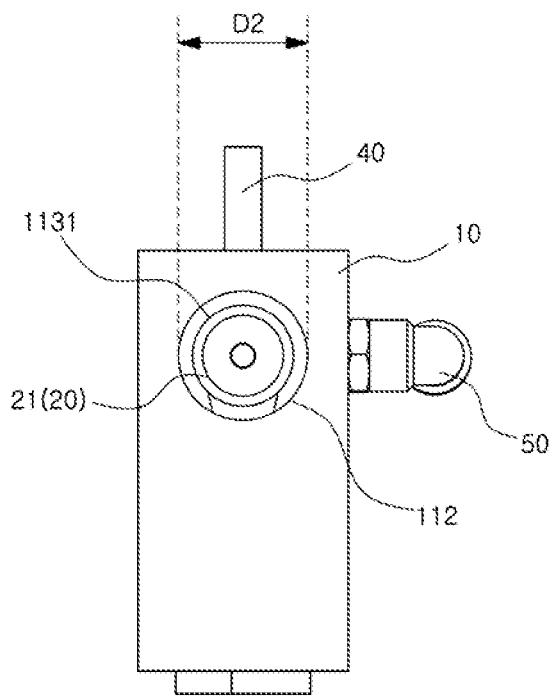
FIG. 5 is a left side view of the venturi nozzle apparatus of FIG. 1.
Figure 6:
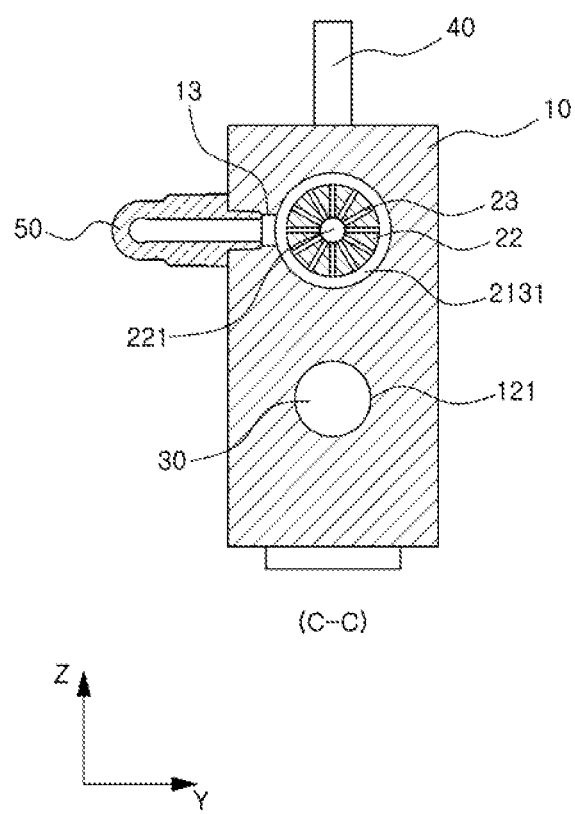
FIG. 6 is a cross-sectional view taken along line C-C of FIG. 4.
Figure 6:
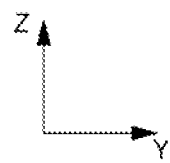
Figure 7:
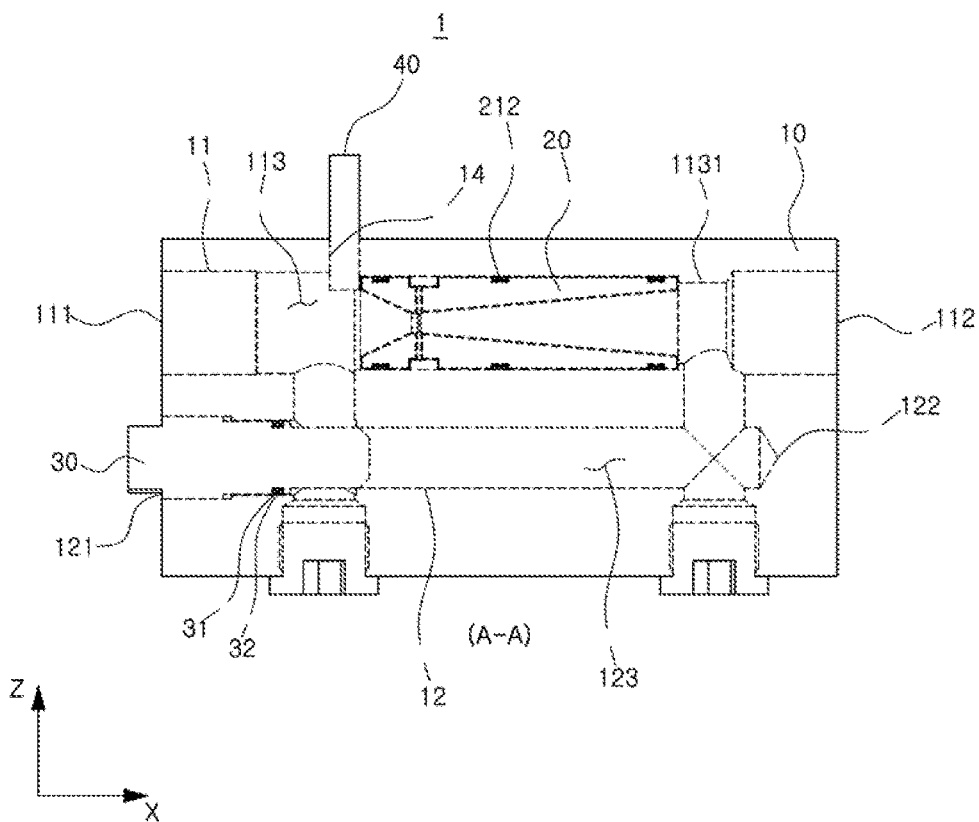
FIG. 7 is a front view illustrating a housing of the venturi nozzle apparatus of FIG. 1.
Figure 8:
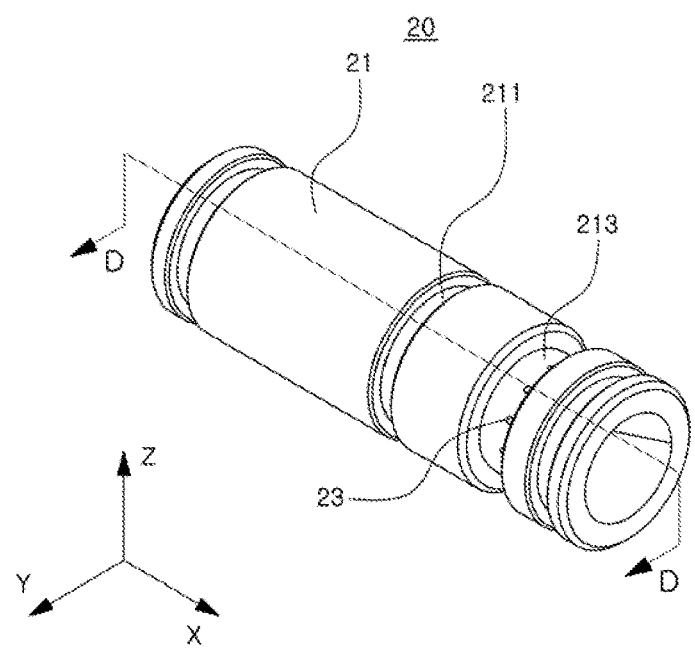
FIG. 8 is a perspective view illustrating an injector unit of the venturi nozzle apparatus of FIG. 1.
Figure 9:
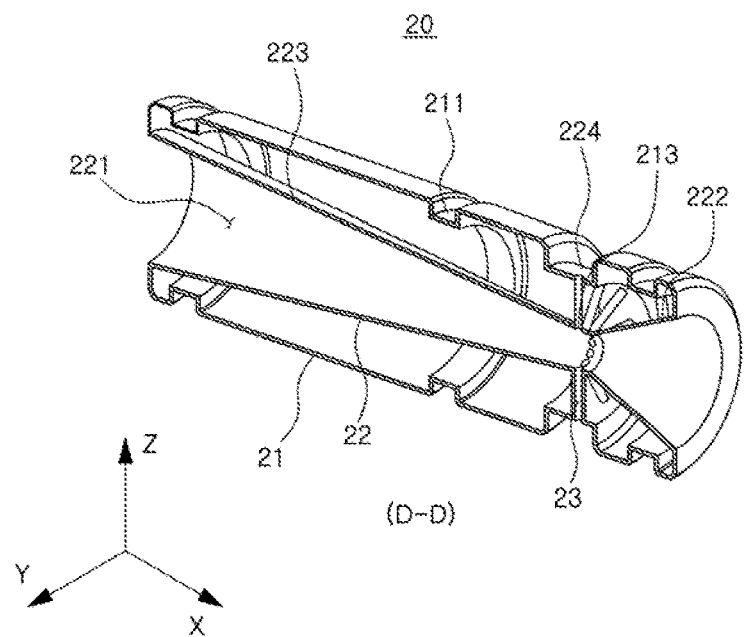
FIG. 9 is a cross-sectional view taken along line D-D of FIG. 8.

Hereinafter, specific embodiments for implementing the spirit of the present inventive concept will be described in detail with reference to the accompanying drawings.

Further, in describing the present inventive concept, when detailed description of a known configuration or function related to the present inventive concept is determined as having the possibility of obscuring the gist of the present inventive concept, the detailed description thereof will be omitted.

Also, when a certain element is described as being "connected" or "coupled" to another element, it should be understood that the element may be directly connected or coupled to the other element, but another element may also be present therebetween.

Terms used herein are for describing specific embodiments and are not intended to limit the present inventive concept. A singular expression includes a plural expression unless the context clearly indicates otherwise.

Also, note that expressions such as "one side" and "the other side" used herein are based on the drawings and may be changed when a direction of the corresponding object is changed. Likewise, some elements in the accompanying drawings may have been exaggerated, omitted, or schematically illustrated, and the size of each element does not necessarily reflect the actual size.

Also, terms including ordinals such as first and second may be used to describe various elements, but the corresponding elements are not limited by such terms. The terms are only used to distinguish one element from another.

The terms "comprise", "comprising", "includes", and/or "including", when used herein, specify the presence of stated features, areas, integers, steps, operations, elements, and/or components but do not preclude the presence or addition of one or more other features, areas, integers, steps, operations, elements, components, and/or groups thereof.

Hereinafter, a specific configuration of a venturi nozzle apparatus according to an embodiment of the present inventive concept will be described with reference to the accompanying drawings.

Referring to FIGS. 1 to 9, a venturi nozzle apparatus 1 according to an embodiment of the present inventive concept may include a housing 10, an injector unit 20, a valve member 30, a stopper member 40, and a gas supply member 50.

The housing 10 is a member formed in the shape of a hollow quadrangular box, and a flow pipe 11, through which at least one of water and water in which a gas is dissolved selectively flows, and a bypass pipe 12, which communicates with the flow pipe 11 to selectively bypass at least one of the water and water in which the gas is dissolved flowing through the flow pipe 11, may be disposed in the housing 10.

The flow pipe 11 may be a pipe member provided to cause at least one of the water and water in which the gas is dissolved to flow. The flow pipe 11 may be formed to extend in one direction.

In this case, the flow pipe 11 may include a supply end portion 111 which is open to allow the water to be selectively supplied, a discharge end portion 112 which is disposed at a position opposite to the supply end portion 111 and which is open to allow the water in which the gas is dissolved to be discharged, and a flow pipe side flow path portion 113 which is provided between the supply end portion 111 and the discharge end portion 112 and through which at least one of the water and water in which the gas is dissolved selectively flows.

Meanwhile, a diameter D1 of the supply end portion 111 may be substantially the same as a diameter D2 of the discharge end portion 112. The injector unit 20 may be inserted through the supply end portion 111.

Meanwhile, to prevent the injector unit 20 inserted through the supply end portion 111 from being detached through the discharge end portion 112, a step 1131 may be disposed in the flow pipe side flow path portion 113. The step 1131 may be formed due to at least a portion of an inner side surface of the flow pipe side flow path portion 113 protruding. In this case, the step 1131 comes in contact with an end portion of the injector unit 20 inserted through the supply end portion 111, thus not only preventing the injector unit 20 from being detached through the discharge end portion 112 but also blocking the insertion of the injector unit 20 through the discharge end portion 112.

The bypass pipe 12 may be a pipe member provided to bypass at least one of the water and water in which the gas is dissolved flowing through the flow pipe 11. In this case, the bypass pipe 12 may be connected to communicate with the flow pipe 11 through at least one connecting portion and may be disposed to be spaced a predetermined distance apart from the flow pipe 11 in a direction perpendicular to a direction in which the flow pipe 11 extends.

Specifically, the bypass pipe 12 may include an insertion end portion 121 which is open to allow the valve member 30 to be inserted, a closed end portion 122 which is disposed at a position opposite to the insertion end portion 121 and closed, and a bypass pipe side flow path portion 123 which is provided between the insertion end portion 121 and the closed end portion 122 and through which at least one of the water and water in which the gas is dissolved selectively flows.

In this case, when the valve member 30 is completely inserted into the insertion end portion 121, an amount of flow in the flow pipe side flow path portion 113 of the flow pipe 11 is not able to be bypassed to the bypass pipe side flow path portion 123 of the bypass pipe 12, and when the valve member 30 completely inserted into the insertion end portion 121 is separated from the insertion end portion 121 to an extent that the valve member 30 is not completely separated from the insertion end portion 121, at least a portion of the amount of flow in the flow pipe side flow path portion 113 may be bypassed to the bypass pipe side flow path portion 123. In this way, as pressure of the water supplied to the injector unit 20 is changed and pressure of the gas injected from a plurality of injection members 23 of the injector unit 20, which will be described below, varies, a concentration at which the gas is dissolved in the water in the injector unit 20 may be controlled.

The injector unit 20 may mix the water and gas to dissolve the gas in the water. To this end, the injector unit 20 may be detachably inserted into the flow pipe 11 of the housing 10. In this case, the injector unit 20 may include a main body 21 which forms an exterior and is replaceably inserted into the flow pipe 11, a venturi member 22 which is disposed inside the main body 21 and has a venturi flow path 221 through which the gas and water are able to be mixed and flow, and the plurality of injection members 23 which have one end portion connected to the main body 21 and the other end portion connected to the venturi member 22 and which are disposed to be spaced apart in a circumferential direction of the venturi member 22.

The main body 21 may include an O-ring insertion portion 211 which has at least a portion of an outer side surface protruding radially inward from the main body 21. The O-ring insertion portion 211 may be formed to extend in a circumferential direction of the main body 21 and may be provided as a plurality of O-ring insertion portions 211. The plurality of O-ring insertion portions 211 may be disposed to be spaced apart at predetermined intervals in a longitudinal direction of the main body 21. In this case, an O-ring member 213 may be fitted to the O-ring insertion portion 211, and due to the O-ring member 213, airtightness between the flow pipe 11 of the housing 10 and the main body 21 may be maintained. Here, the terms relating to directions will be defined. A direction that is radially inward from the main body 21 refers to a direction from an inner side surface of the main body 21 toward a central portion of the main body 21, the circumferential direction of the main body 21 refers to a direction rotating along an outer circumferential surface of the main body 21, and the longitudinal direction of the main body 21 refers to the x-axis direction of FIG. 1. In this case, the circumferential direction of the main body 21 may be any one of clockwise and counterclockwise when viewed from a side of the main body 21, and unless described otherwise, all of the above directions encompass both positive and negative directions.

Meanwhile, the main body 21 may include a protruding portion 212 which has at least a portion of an outer side surface protruding radially inward from the main body 21. Here, a degree to which the protruding portion 212 protrudes radially inward from the main body 21 may be higher than a degree to which the O-ring insertion portion 211 protrudes radially inward from the main body 21. In this case, the protruding portion 212 may extend in the circumferential direction of the main body 21 and may be disposed between two O-ring insertion portions 211 adjacent to each other in the longitudinal direction of the main body 21.

Meanwhile, the other end portion of the injection member 23 may be connected to communicate with an inner side surface of the protruding portion 212. As the protruding portion 212 protrudes radially inward from the main body 21, an outer side surface of the protruding portion 212 and an inner side surface of the flow pipe side flow path portion 113 may be spaced apart from each other, and thus a predetermined space 2131 may be formed. The space 2131 may be used as a space in which a gas supplied from the gas supply member 50 flows, and the gas flowing in the space 2131 may be supplied to the venturi member 22 through the other end portion of the injection member 23 connected to the inner side surface of the protruding portion 212.

The venturi member 22 may serve to use the venturi effect to form a vortex of water supplied from the outside. To this end, the venturi member 22 may include the venturi flow path 221 in which the gas and water are able to be mixed and flow.

Specifically, the venturi member 22 may include a first downward inclined portion 222 which is inclined downward from one end portion toward the other end portion, a second downward inclined portion 223 which is inclined downward from the other end portion toward one end portion, and a neck portion 224 connected between the first downward inclined portion 222 and the second downward inclined portion 223. Here, a cross-sectional area of the first downward inclined portion 222 may gradually decrease from the one end portion toward the other end portion, and a cross-sectional area of the second downward inclined portion 223 may gradually decrease from the other end portion toward the one end portion. In this case, the one end portion of the injection member 23 may be connected to communicate with the neck portion 224. In this way, since the injection member 23 is connected to communicate with the neck portion 224 in which a flow velocity increases, the water and gas may be smoothly mixed in the venturi flow path 221.

Meanwhile, the amount of flow passing through the venturi flow path 221 of the venturi member 22 may be determined according to a diameter of one end portion and the other end portion of the venturi member 22. Due to being coupled to an inner portion of a pipe, the conventional venturi member only handles an amount of flow according to a preset diameter of the venturi member. However, since the venturi member 22 according to an embodiment of the present inventive concept is coupled to an inner portion of the main body 21 and the main body 21 is detachably coupled to the flow pipe 11, when it is necessary for the venturi member 22 to correspond to a change in the amount of flow, the main body 21 to which the venturi member 22 having a diameter suitable for the changed amount of flow is coupled is selected and then coupled to the flow pipe 11. In this way, unlike the related art, it is possible to correspond to a change in the amount of flow.

The plurality of injection members 23 may deliver the gas provided from the gas supply member 50 to the venturi member 22. Also, the plurality of injection members 23 may increase a contact area between the water flowing in the venturi member 22 and the gas provided from the gas supply member 50.

To this end, one end portion of the injection member 23 may be connected to communicate with the protruding portion 212 of the main body 21, and the other end portion of the injection member 23 may be connected to communicate with the neck portion 224 of the venturi member 22.

Also, the plurality of injection members 23 may be disposed to be spaced apart from each other in the circumferential direction of the venturi member 22 and may inject the gas provided from the gas supply member 50 radially inward from the venturi flow path 221 of the venturi member 22. Thus, the water forming a vortex in the venturi flow path 221 and the gas injected radially inward from the venturi flow path 221 collide with each other. In this way, the gas may be efficiently dissolved in the water.

The valve member 30 may control the concentration at which the gas is dissolved in the water in the injector unit 20. To this end, the valve member 30 may be inserted into the bypass pipe 12 of the housing 10. In this way, the valve member 30 may cause at least one of the water and water in which the gas is dissolved to flow to at least one of the flow pipes 11 of the housing 10 and the bypass pipe 12 of the housing 10.

Meanwhile, the valve member 30 may be inserted into the insertion end portion 121 of the bypass pipe 12 of the housing 10, and according to a degree to which the valve member 30 is inserted into the insertion end portion 121, at least one of the water and water in which the gas is dissolved may flow to at least one of the flow pipe 11 of the housing 10 and the bypass pipe 12 of the housing 10. For example, the valve member 30 may be provided as a plug valve, but this is only an example, and the spirit of the present inventive concept is not limited thereby.

In this case, the valve member 30 may include an O-ring insertion portion 31 which has at least a portion of an outer side surface protruding radially inward from the valve member 30. The O-ring insertion portion 31 may be formed to extend in a circumferential direction of the valve member 30. In this case, an O-ring member 32 may be fitted to the O-ring insertion portion 31, and due to the O-ring member 32, airtightness between the bypass pipe 12 of the housing 10 and the valve member 30 may be maintained.

Meanwhile, in the present embodiment, the case in which the valve member 30 is coupled by being fitted and coupled to the insertion end portion 121 of the bypass pipe 12 has been described as an example, but this is for convenience of description, and the spirit of the present inventive concept is not limited thereby. For example, male screw threads may be formed on at least a portion of an outer side surface of the valve member 30, female screw threads may be formed on at least a portion of an inner side surface of the insertion end portion 121, and the valve member 30 and the insertion end portion 121 may be screw-coupled to each other.

The stopper member 40 may prevent the injector unit 20, which is inserted through the supply end portion 111 of the flow pipe 11, from being detached through the supply end portion 111 of the flow pipe 11.

To this end, the stopper member 40 may be selectively inserted into the housing 10. In this case, at least a portion of the stopper member 40 may be inserted into a stopper member insertion hole 14 formed in the housing 10.

In this case, for example, the stopper member 40 may be provided in the shape of a column that extends in one direction. For example, the stopper member 40 may be inserted into the stopper member insertion hole 14 after the injector unit 20 is inserted through the supply end portion 111 of the flow pipe 11. On the other hand, when it is necessary to replace the injector unit 20, the stopper member 40 inserted into the stopper member insertion hole 14 may be separated from the stopper member insertion hole 14 first, and then the injector unit 20 inserted into the supply end portion 111 may be separated from the supply end portion 111.

Meanwhile, in the present embodiment, the case in which the stopper member 40 is coupled by being fitted and coupled to the stopper member insertion hole 14 of the housing 10 has been described as an example, but the spirit of the present inventive concept is not limited thereto. For example, male screw threads may be formed on at least a portion of an outer side surface of the stopper member 40, female screw threads may be formed on at least a portion of an inner side surface of the stopper member insertion hole 14, and the stopper member 40 may be coupled to the stopper member insertion hole 14 by a screw-coupling method.

The gas supply member 50 may selectively supply the gas from the outside to the injector unit 20. To this end, the gas supply member 50 may be provided to be connectable to the housing 10, and in this case, an end portion of the gas supply member 50 may be inserted into a gas supply member insertion hole 13 disposed in the housing 10.

Meanwhile, the gas supply member 50 may be connected to communicate with the injection member 23 of the injector unit 20. The external gas provided through the gas supply member 50 may flow in the space 2131 formed due to the inner side surface of the flow pipe side flow path portion 113 and the outer side surface of the protruding portion 212 being spaced apart from each other, and the gas flowing in the space 2131 may be supplied to the plurality of injection members 23 and injected into the venturi member 22.

Hereinafter, the operation and effects of the venturi nozzle apparatus 1 having the above-described configuration will be described with reference to FIGS. 10 and 11.

Figure 10:
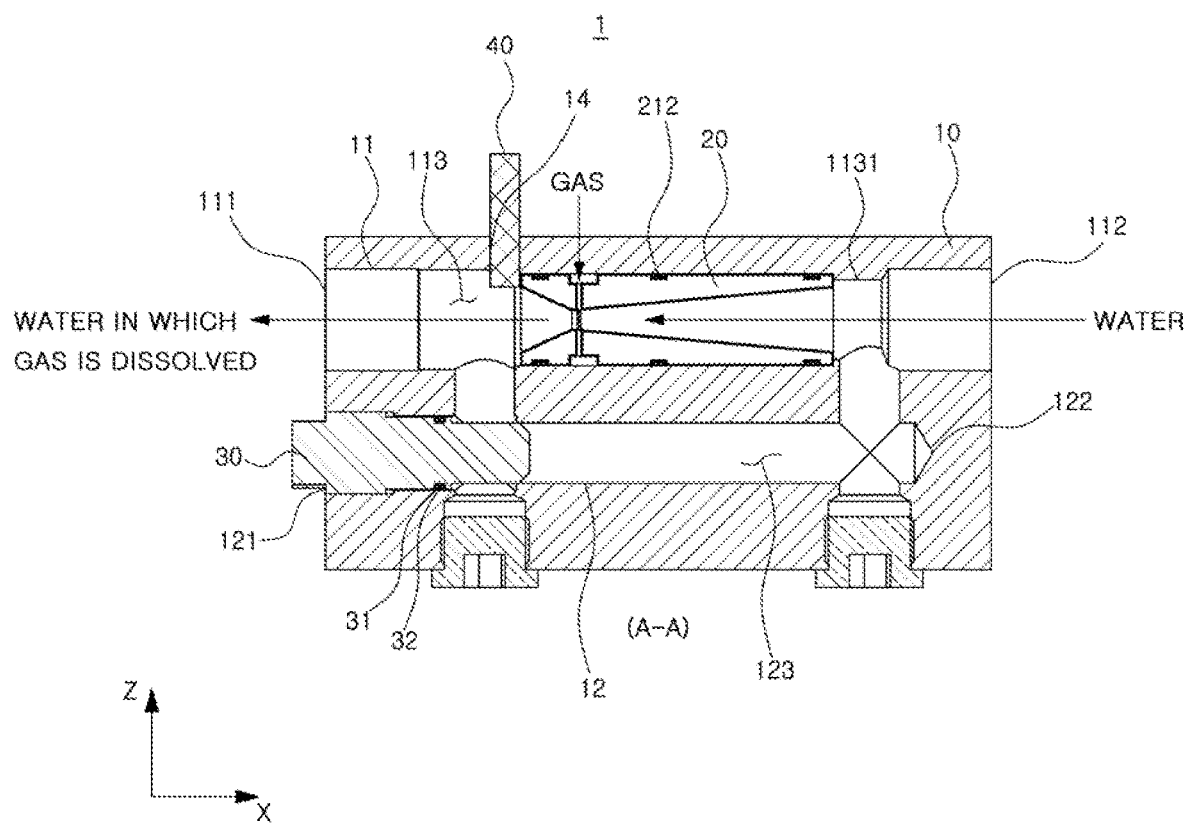
FIGS. 10 and 11 are operational state views of the venturi nozzle apparatus according to an embodiment of the present inventive concept.

Referring to FIG. 10, the injector unit 20 is inserted through the supply end portion 111 of the flow pipe 11 disposed in the housing 10. When insertion of the injector unit 20 is completed, the stopper member 40 is inserted into the stopper member insertion hole 14, which is pre-installed in the housing 10, to prevent the injector unit 20 from being detached from the flow pipe 11. In this way, installation of the injector unit 20 in the housing 10 is completed.

Next, the gas supply member 50 is connected to the gas supply member insertion hole 13 which is pre-installed in the housing 10.

Then, water is supplied from the outside through the supply end portion 111 of the flow pipe 11. In this case, since the valve member 30 is completely inserted into the insertion end portion 121 of the bypass pipe 12 disposed in the housing 10, the water supplied from the outside can only be supplied to the flow pipe 11 without being bypassed to the bypass pipe 12.

Meanwhile, the water supplied as above flows along the venturi flow path 221 disposed in the venturi member 22 of the injector unit 20 and forms a vortex. In this case, the gas provided from the gas supply member 50 is supplied to the venturi flow path 221 through the plurality of injection members 23 and is dissolved in the water due to colliding with the vortex of the water. The water in which the gas is dissolved passes through the venturi flow path 221 and is discharged through the discharge end portion 112 of the flow pipe 11.

Figure 11:
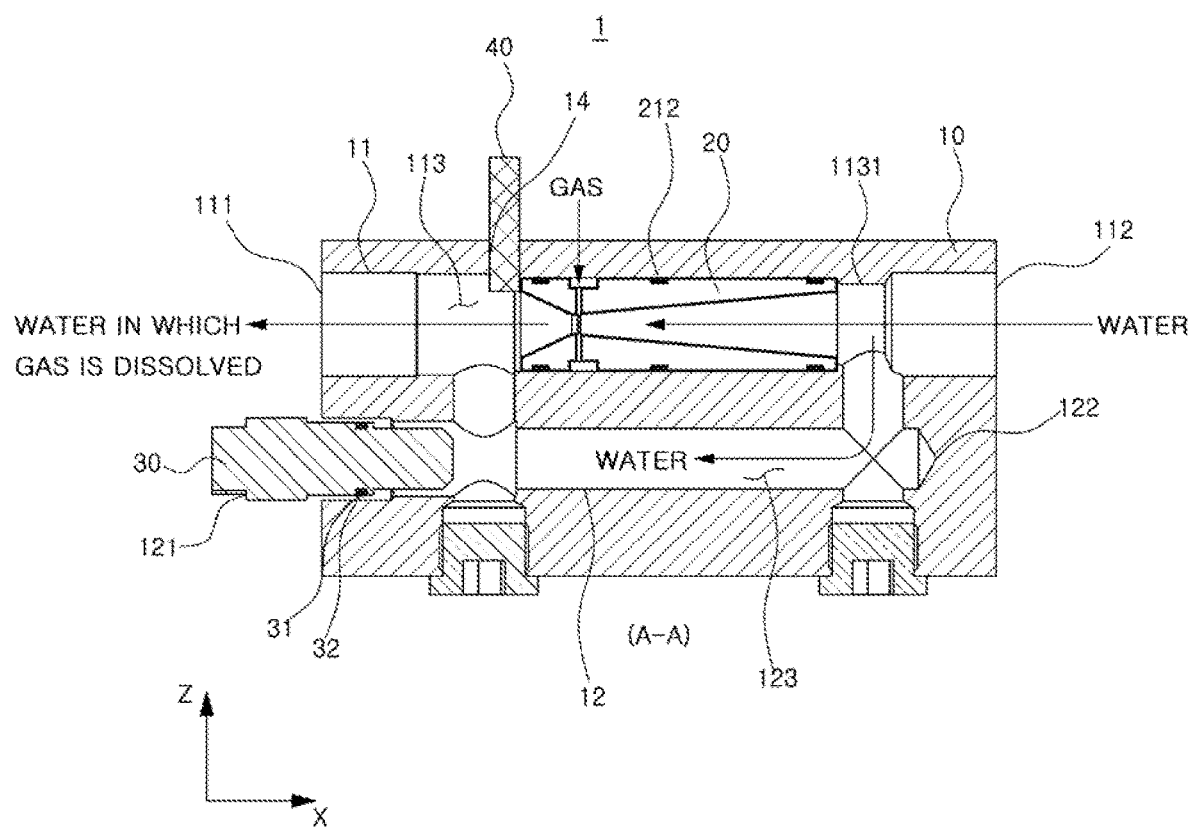

Referring to FIG. 11, as the degree of insertion of the valve member 30 which is completely inserted into the insertion end portion 121 of the bypass pipe 12 is controlled, at least a portion of the water supplied from the outside may be bypassed to the bypass pipe 12. Due to the water bypassed to the bypass pipe 12 in this way, pressure of the water supplied to the venturi flow path 221 of the venturi member 22 may be decreased, and as the amount of gas ejected to the venturi flow path 221 is increased, a concentration at which the gas is dissolved in the water in the venturi flow path 221 may be increased.

A venturi nozzle apparatus according to embodiments of the present inventive concept can be manufactured with a simplified manufacturing process and reduced manufacturing costs and can correspond to a change in the amount of flow.

Specific embodiments of the present inventive concept have been described above, but the embodiments are only examples, and the present inventive concept is not limited thereto and should be construed as having the broadest possible range according to the basic spirit disclosed herein. Those of ordinary skill in the art may combine/substitute the embodiments disclosed herein and carry out the embodiments in patterns not stated herein, but such patterns also belong to the scope of the present inventive concept. In addition, those of ordinary skill in the art may easily change or modify the disclosed embodiments on the basis of the present specification, and it is apparent that such changes or modifications also fall within the scope of the present inventive concept.

What is claimed is:

1. A venturi nozzle apparatus which mixes water and a gas to dissolve the gas in the water, the venturi nozzle apparatus comprising:
   a housing in which a flow pipe, through which at least one of the water and the water in which the gas is dissolved selectively flows, and a bypass pipe, which communicates with the flow pipe to selectively bypass at least one of the water and the water in which the gas is dissolved flowing through the flow pipe, are disposed;
   an injector unit which is detachably inserted into the flow pipe of the housing and configured to selectively receive the gas and the water to dissolve the gas in the water;
   a valve member which is inserted into the bypass pipe of the housing and configured to cause at least one of the water and the water in which the gas is dissolved to flow to at least one of the flow pipe of the housing and the bypass pipe of the housing, wherein the flow pipe includes:
      a supply end portion which is open to allow the water to be selectively supplied;
      a discharge end portion which is disposed at a position opposite to the supply end portion and which is open to allow the water in which the gas is dissolved to be discharged; and
      a flow pipe side flow path portion which is provided between the supply end portion and the discharge end portion and through which at least one of the water and the water in which the gas is dissolved selectively flows, wherein the injector unit is inserted through the supply end portion of the flow pipe; and
   a stopper member which is selectively inserted into the housing to prevent the injector unit from being detached through the supply end portion of the flow pipe,
   wherein the stopper member is in direct contact with an end of the injector unit,
   wherein an end portion of the stopper member is within the flow pipe side flow path portion of the flow pipe,
   wherein the bypass pipe includes:
      an insertion end portion to which the valve member is inserted;
      a closed end portion which is disposed at a position opposite to the insertion end portion; and
      a bypass pipe side flow path portion which is provided between the insertion end portion and the closed end portion and through which at least one of the water and the water in which the gas is dissolved selectively flows,
   wherein the supply end portion of the flow pipe and the insertion end portion of the bypass pipe are formed in a front end portion of the housing.

2. The venturi nozzle apparatus of claim 1, wherein the flow pipe side flow path portion includes a step which is formed due to at least a portion of an inner side surface protruding,
   wherein, as the injector unit inserted through the supply end portion of the flow pipe is caught at the step, the injector unit is prevented from being detached through the discharge end portion of the flow pipe.

3. The venturi nozzle apparatus of claim 1, wherein, according to a degree to which the valve member is inserted into the bypass pipe of the housing, at least one of the water and the water in which the gas is dissolved flowing through the flow pipe of the housing is bypassed to the bypass pipe of the housing, and thus an amount of the gas being supplied to the injector unit is controlled.

4. The venturi nozzle apparatus of claim 1, wherein the injector unit includes:
   a main body which forms an exterior and is replaceably inserted into the flow pipe;
   a venturi member which is disposed inside the main body and has a venturi flow path through which the gas and the water are able to be mixed and flow; and
   a plurality of injection members which have one end portion connected to the main body and the other end portion connected to the venturi member and which are disposed to be spaced apart in a circumferential direction of the venturi member.

5. The venturi nozzle apparatus of claim 4, wherein the main body includes a protruding portion which has at least a portion of an outer side surface protruding radially inward from the main body and an inner side surface to which the other end portion of the injection member is connected to communicate, and
   wherein the protruding portion extends in a circumferential direction of the main body.

6. The venturi nozzle apparatus of claim 5, further comprising a gas supply member which is provided to be connectable to the housing and connected to communicate with the injection member of the injector unit to selectively supply the gas from the outside to the injector unit.

7. The venturi nozzle apparatus of claim 6, wherein:
   the gas provided from the outside through the gas supply member flows in a space which is formed due to the inner side surface of the flow pipe side flow path portion and the outer side surface of the protruding portion being spaced apart from each other; and
   wherein the gas flowing in the space is supplied to the plurality of injection members.

8. The venturi nozzle apparatus of claim 6, wherein a gas supply member insertion hole into which the gas supply member is selectively inserted is formed in the housing.

9. The venturi nozzle apparatus of claim 1, wherein a stopper member insertion hole into which the stopper member is selectively inserted is formed in the housing.

* * * * *